United States Patent
Sato et al.

(10) Patent No.: US 6,680,786 B1
(45) Date of Patent: Jan. 20, 2004

(54) IMAGE PROCESSING METHOD AND DEVICE FOR HALF-TONE REPRESENTATION

(75) Inventors: Kazuhiko Sato, Kawasaki (JP); Hiroshi Oshio, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/502,468

(22) Filed: Feb. 11, 2000

(30) Foreign Application Priority Data

Apr. 5, 1999 (JP) .......................................... 11-098132

(51) Int. Cl.⁷ .............................................. H04N 1/405
(52) U.S. Cl. ...................................... 358/3.18; 358/3.2
(58) Field of Search ............................... 358/3.09, 3.11, 358/3.13, 3.2, 3.02, 3.14, 3.17, 3.16, 3.06, 534, 535, 536

(56) References Cited

U.S. PATENT DOCUMENTS

| | | | | |
|---|---|---|---|---|
| 4,805,033 A | * | 2/1989 | Nishikawa | 358/3.1 |
| 4,814,886 A | * | 3/1989 | Kuge et al. | 358/3.17 |
| 4,924,301 A | * | 5/1990 | Surbrook | 358/534 |
| 5,448,366 A | * | 9/1995 | Hamilton, Jr. | 358/3.19 |
| 5,463,720 A | * | 10/1995 | Granger | 358/1.9 |
| 5,526,445 A | * | 6/1996 | Smutek et al. | 358/3.17 |
| 5,587,811 A | * | 12/1996 | Liguori | 358/3.2 |
| 5,884,013 A | * | 3/1999 | Bosschaerts et al. | 358/1.9 |
| 2002/0171873 A1 | * | 11/2002 | Chang | 358/3.06 |

FOREIGN PATENT DOCUMENTS

| | | |
|---|---|---|
| JP | 2-226864 | 9/1990 |
| JP | 9-107473 | 4/1997 |

\* cited by examiner

*Primary Examiner*—Scott Rogers
(74) *Attorney, Agent, or Firm*—Westerman Hattori Daniels & Adrian, LLP

(57) ABSTRACT

A method of representing a half-tone level with dot sets each comprised of contiguous dots including the steps of providing a dot-set center at an offset point that is neither a center of a dot nor a midpoint between centers of dots, selecting dots that are included inside a symmetric-shape area having a center thereof at the dot-set center, an area size of the symmetric-shape area being commensurate with an input image level, and representing a half-tone level corresponding to the input image level by forming a dot set comprised of the selected dots.

18 Claims, 18 Drawing Sheets

FIG.3A

| 10 | 4  | 6  | 8  |
|----|----|----|----|
| 12 | 0  | 2  | 14 |
| 7  | 9  | 11 | 5  |
| 3  | 15 | 13 | 1  |

FIG.3B

| 13 | 7  | 6  | 12 |
|----|----|----|----|
| 8  | 1  | 0  | 5  |
| 9  | 2  | 3  | 4  |
| 14 | 10 | 11 | 15 |

FIG.3C

| 15 | 4  | 8 | 12 |
|----|----|---|----|
| 11 | 0  | 1 | 5  |
| 7  | 3  | 2 | 9  |
| 14 | 10 | 6 | 13 |

FIG.3D

| 12 | 4 | 8 | 14 |
|----|---|---|----|
| 11 | 0 | 2 | 6  |
| 7  | 3 | 1 | 10 |
| 15 | 9 | 5 | 13 |

FIG.3E

| 12 | 4 | 8 | 14 |
|----|---|---|----|
| 10 | 0 | 1 | 7  |
| 6  | 3 | 2 | 11 |
| 15 | 9 | 5 | 13 |

FIG.3F

| 15 | 14 | 13 | 12 |
|----|----|----|----|
| 4  | 3  | 2  | 11 |
| 5  | 0  | 1  | 10 |
| 6  | 7  | 8  | 9  |

FIG.3G

| 15 | 11 | 5 | 13 |
|----|----|---|----|
| 7  | 3  | 1 | 9  |
| 10 | 2  | 0 | 4  |
| 14 | 6  | 8 | 12 |

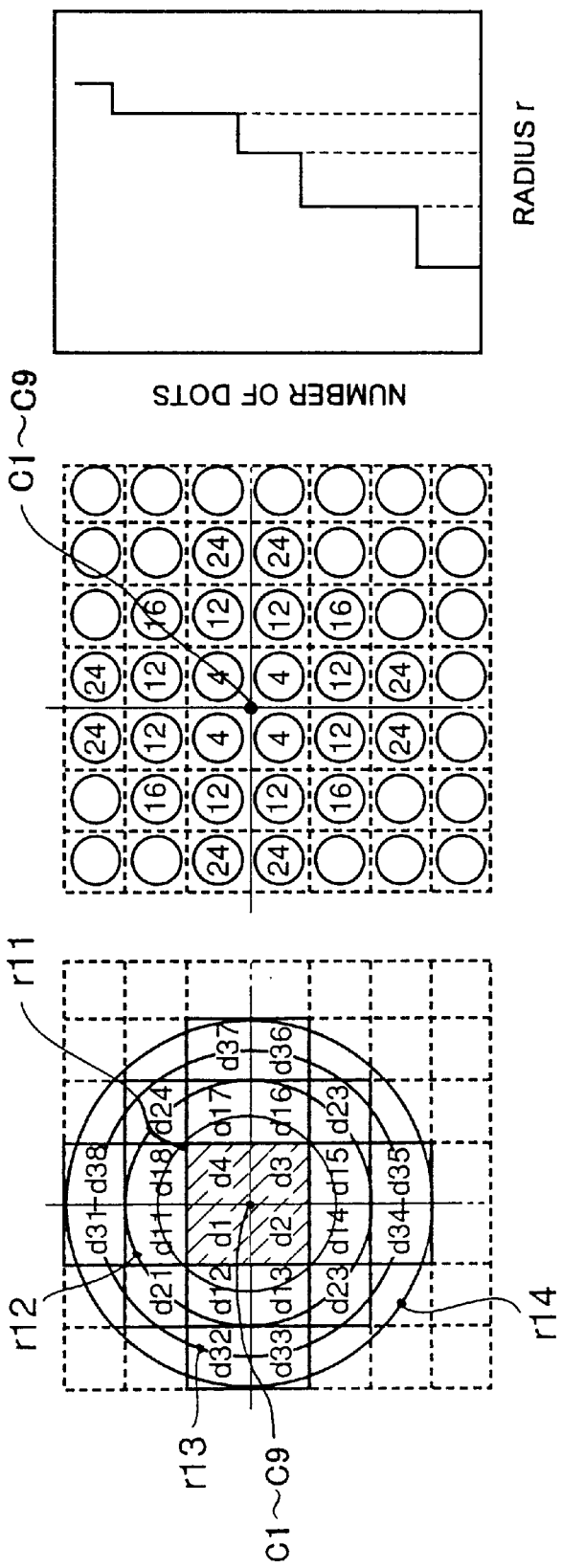

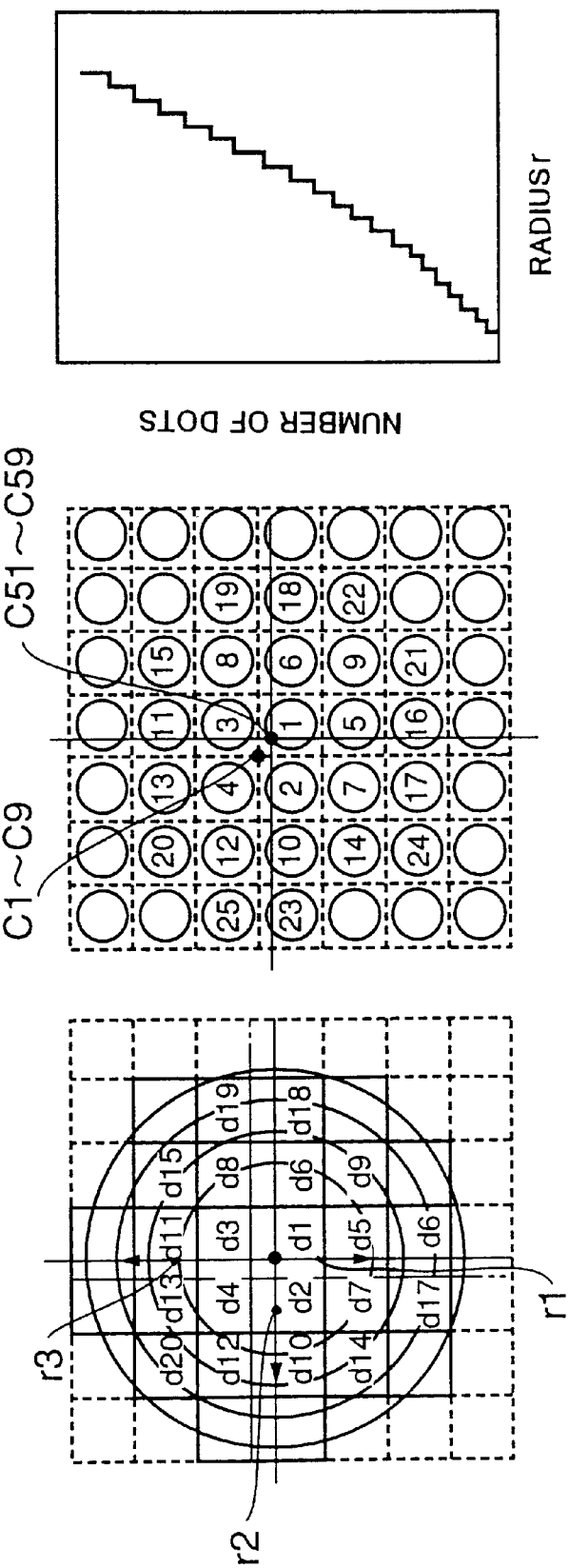

| AREA RATIO | DOT NO. | SQUARE OF DISTANCE |
|---|---|---|
| 0 | d 1 | L 1 |
| ⋮ | ⋮ | ⋮ |
| ⋮ | ⋮ | ⋮ |
| 1 | d n | L n |

Column headers labeled 101, 102, 103.

FIG. 18

| INPUT DATA (201) | AREA RATIO (202) |
|---|---|
| 0 | 0 |
| ⋮ | ⋮ |
| FF | 1 |

IMAGE PROCESSING METHOD AND DEVICE FOR HALF-TONE REPRESENTATION

BACKGROUND OF THE INVENTION

1. Field of the Invention

The present invention relates to image processing methods and image processing devices, and particularly relates to an image processing method and an image processing device which print a plurality of dots to generate a dot set that represents a half-tone level.

2. Description of the Related Art

Printers and printing presses reproduce images by applying ink or toner onto print sheets. A portion where ink or toner is applied represents a darker level in contrast with a portion with no ink or no toner applied thereto representing the lightest level.

When a half-tone level needs to be reproduced, however, it is not easy to control the amount of ink or toner applied onto a print sheet so as to achieve a right amount for a given half-tone level. Because of this, a half-tone is generally represented by controlling a size of an area where ink or toner is applied on a print sheet. This is generally referred to as a pseudo-half-tone scheme.

The pseudo-half-tone scheme includes a screen-dot method, a dither method, and an error-diffusion method, for example.

The screen-dot method is typically used in printing presses. A dot screen film having a periodical variation is superimposed on a transparent film representing an image, and the superimposed image is projected to expose a film. As a result of the exposure, dots are generated in such a fashion as to have area sizes corresponding to transparentness of the original image. An electronic means is utilized these days to generate a dot screen, and screen-dot processing is performed on such an electronic dot screen to generate dots by using a high-resolution image setter.

FIG. 1 is an illustrative drawing showing a circular dot set of the related art.

In FIG. 1, color-dot sets D11 through D15 and white-dot sets D21 through D24 are formed to have circular shapes around predetermined dot-set centers C1 through C9.

In accordance with a specified gray level, an appropriate number of color dots are printed around dot-set centers to produce the color-dot sets D11 through D15, leaving blank areas serving as the white-dot sets D21 through D24. Each of the color-dot sets D11 through D15 is formed to be a circular dot set when the specified gray level corresponds to an area ratio substantially lower than 50%.

As the specified gray level increases, an area ratio of color-dot sets to white-dot sets (blank areas) increases. When the area ratio exceeds 50%, color dots are printed such as to leave circular blank areas, which form the white-dot sets D21 through D24. Namely, the white-dot sets D21 through D24 are formed to be a circular dot set when the specified gray level is substantially higher than the area ratio of 50%.

When the area ratio is smaller than 50%, only those dots which are closer to a center of a color-dot set than to a center of a white-dot set are printed as color dots. In FIG. 1, for example, a dot d0 is closer to the center of the white-dot set D22 than to the center of the color-dot set D13, so that the dot d0 will never be a color dot as long as the area ratio is smaller than 50%. As a result, the color-dot set D13 ends up having a square shape when the area ratio is exactly 50%. The same applies in the case of the other color-dot sets D11, D12, D14, and D15 in FIG. 1.

FIG. 2 is an illustrative drawing showing an ellipse dot set of the related art.

In FIG. 2, the color-dot sets D31 through D35 and the white-dot sets D41 through D44 are formed to have ellipse shapes around predetermined dot-set centers C11 through C19.

In accordance with a specified gray level, an appropriate number of color dots are printed around dot-set centers to produce the color-dot sets D31 through D35, each of which is an ellipse shape when the specified gray level corresponds to an area ratio substantially lower than 50%.

When the area ratio is smaller than 50%, only those dots which are closer to a center of a color-dot set than to a center of a white-dot set are printed as color dots. As a result, the color-dot set D33 ends up having a hexagon shape as shown in FIG. 2 when the area ratio is exactly 50%. The same applies in the case of the other color-dot sets D31, D32, D34, and D35 in FIG. 1.

In the following, the dither method will be described.

The dither method is typically used in printers and display devices having low resolution. While there are several variations to the dither method, an organized dither method is most generally employed.

In this method, a threshold matrix called a dither matrix is used to convert an input image into a dot image by checking whether input-image data exceeds predetermined thresholds.

Choice of a type of a dither matrix determines which one of a half-tone dither image, a dot-concentrated dither image, etc is obtained.

FIGS. 3A through 3G are illustrative drawings showing different types of dither matrixes.

FIG. 3A shows a half-tone-type dither matrix, and FIG. 3B illustrates a screw-type dither matrix.

FIG. 3C exhibits a variation of the screw-type dither matrix, and FIG. 3D demonstrates a half-tone-emphasized-type dither matrix. Further, FIG. 3E shows a dot-concentrated-type dither matrix, and FIGS. 3F illustrates a spiral-dot-type dither matrix. Finally, FIG. 3G shows a square-dot-type dither matrix.

The half-tone-type dither matrix has thresholds assigned to respective dots such that lower thresholds correspond to smaller ordinal numbers shown in FIG. 3A. As a gray level of an image pixel increases, dots are generated in a scattered manner in an ascending order of the ordinal numbers. In this manner, a dot set corresponding to an image pixel is created.

In the screw-type dither matrix and the spiral-type dither matrix, thresholds are assigned such that lower thresholds correspond to smaller ordinal numbers as shown in FIG. 3B and FIG. 3F, respectively, so as to generate dots in a spiral fashion. As a gray level of a pixel increases, dots are generated in an ascending order of the ordinal numbers so as to spread from a center to peripheral areas. A dot set corresponding to an image pixel is created in this manner.

As shown in FIG. 3C, the variation of the screw-type dither matrix has a different order of dot generation at the peripheral portion of the matrix as compared with the original screw-type dither matrix shown in FIG. 3B. In comparison with the original screw type, this variation has a threshold arrangement insuring that a contour shape of the dot set is closer to a circle. Namely, the contour shape of the dot set more closely approximates a circular shape.

In the half-tone-emphasized-type dither matrix, the dot-concentrated-type dither matrix, and the square-dot-type dither matrix as shown in FIGS. 3D, 3E, and 3G, respectively, dot arrangement is concentrated at a center, and is scattered in the peripheral portion of the matrix.

Use of such dither matrixes described above or use of circular/ellipse dot sets previously described generates a plurality of dots that are so concentrated as to form a contiguous dot set. Hereinafter, these methods are referred to as a dot-concentrated-type method.

In the dot-concentrated-type methods, a size of a given dot set gradually increases as an input-image level increases. This results in a better gradation of half-tone representation despite lower resolution of obtained images compared to when other pseudo-half-tone schemes are used. Especially, when an image is printed on a print sheet by using ink or toner, the gradation of half-tone representation is smooth in relation to changes in dot-set sizes, thereby providing a stable representation of half-tone levels.

The dot-concentrated-type methods, however, are rather sensitive to an order of dot generation.

The screw-variation type, the half-tone-emphasized type, the dot-concentrated type, the square-dot type, and the spiral-dot type all suffer a drawback in that a contour shape of a dot set deviates from a circular shape. This results in unstable reproduction of dot shapes on print sheets.

The half-tone type has a disadvantage in that gradation of half-tone representation lacks smoothness because of a scattered dot arrangement.

The spiral-dot type and the screw type have a center of the dot set deviating greatly from an expected center position of the dot set. This causes a problem in that dot sets are not generated at desired positions.

The half-tone-type and the screw type are not based on an established principle about an order in which dots are generated as a gray level increases. This poses a problem when a matrix having a large number of dots needs to be used.

With reference to the circular dot sets of FIG. 1, the number of dots is increased as a gray level increases.

FIGS. 4A through 4C are illustrative drawings for explaining how to generate a circular dot set. FIG. 4A shows dots to be colored in relation to various radii. FIG. 4B shows how the number of dots increases in response to an increase in the radius. FIG. 4C shows a relation between the radius and the number of dots.

As shown in FIG. 4A, four dots d1 through d4 are included (i.e., have centers thereof included) in a circle having a radius r11 around a center which corresponds to one of the dot-set centers C1 through C9 of FIG. 1. Further, eight dots d11 through d18 are included in addition to the four dots d1 through d4 when a radius r12 is considered, bringing the total number of included dots to twelve.

Further, the four dots d1 through d4, the eight dots d11 through d18, and additional four dots d21 through d24, a total number of which is as many as sixteen, are included in a circle having a radius r13. When a circle having a radius r14 is considered, a total of twenty four dots are included, including the four dots d1 through d4, the eight dots d11 through d18, the four dots d21 through d24, and further eight dots d31 through d38. FIG. 4B provides a clear illustration of such a successive increase of printed dots in relation to an increase in the radius.

In this manner, the number of dots increases by a large number at each step of radius increase. This is clearly shown in FIG. 4C. Because of such a large increase at each step, a half-tone representation of a resulting image tends to have conspicuous step-wise changes.

Further, the shape of a dot set may be far from a circle, the degree of which depends on a specified radius. Such a deviation from the circular shape tend to give unstable visual impression.

Accordingly, there is a need for an image processing method and an image processing device which can provide a stable and smooth gradation in half-tone representation even when a large dot set is employed.

SUMMARY OF THE INVENTION

Accordingly, it is a general object of the present invention to provide an image processing method and an image processing device which can satisfy the need described above.

It is another and more specific object of the present invention to provide an image processing method and an image processing device which can provide a stable and smooth gradation in half-tone representation even when a large dot set is employed.

In order to achieve the above objects according to the present invention, a method of representing a half-tone level with dot sets each comprised of contiguous dots includes the steps of providing a dot-set center at an offset point that is neither a center of a dot nor a midpoint between centers of dots, selecting dots that are included inside a symmetric-shape area having a center thereof at the dot-set center, an area size of the symmetric-shape area being commensurate with an input image level, and representing a half-tone level corresponding to the input image level by forming a dot set comprised of the selected dots.

According to the method described above, the dot-set center is positioned at the offset position that is neither a center of a dot nor a midpoint between centers of dots, and dots are selected if they are included inside the symmetric-shape area having a center thereof at the dot-set center, an area size of the symmetric-shape area being commensurate with an input image level. With the dot-set center positioned at such an offset position, no two dots have centers thereof equal distance from the dot-set center. This insures that the number of dots in a given dot set increases one by one as the input image level increases, thereby achieving a smooth gradation of half-tone representation.

According to another aspect of the present invention, the symmetric-shape area is circular, and the offset point is positioned such that the dot set comprised of the selected dots maintains a shape as close to a circle as possible. This achieves a stable half-tone representation.

Further, according to another aspect of the present invention, the offset point is positioned as close to a dot center as possible. This insures that the dot sets appear close to their expected positions.

Other objects and further features of the present invention will be apparent from the following detailed description when read in conjunction with the accompanying drawings.

BRIEF DESCRIPTION OF THE DRAWINGS

FIGS. 3A through 3G are illustrative drawings showing different types of dither matrixes;

FIGS. 4A through 4C are illustrative drawings for explaining how to generate a circular dot set;

FIGS. 9A through 9C are illustrative drawings for explaining the way a circular dot set is generated according to the embodiment of the present invention;

FIG. 16 is an illustrative drawing showing a data structure of the colored-dot-determination table according to the embodiment of the present invention;

FIG. 18 is an illustrative drawing showing a data structure of a conversion table according to the embodiment of the present invention.

DESCRIPTION OF THE PREFERRED EMBODIMENTS

In the following, embodiments of the present invention will be described with reference to the accompanying drawings.

Figure 5:
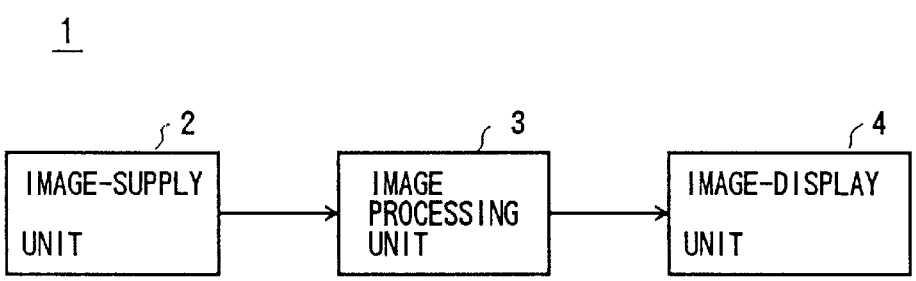
FIG. 5 is a block diagram of an image processing device according to an embodiment of the present invention.

FIG. 5 is a block diagram of an image processing device according to an embodiment of the present invention.

An image processing device 1 of FIG. 5 includes an image-supply unit 2, an image processing unit 3, and an image-display unit 4.

The image-supply unit 2 includes a memory storage such as a hard-drive, and stores image data representing image frames. The image data stored in the image-supply unit 2 is supplied to the image processing unit 3.

The image processing unit 3 includes an information processing device such as a computer, and applies area-level processing to the image data to generate display-dot data having image levels represented by dots. The display-dot data is supplied from the image processing unit 3 to the image-display unit 4.

The image-display unit 4 includes an image forming device such as a printer, and presents an image corresponding to the display-dot data supplied from the image processing unit 3.

Figure 6:
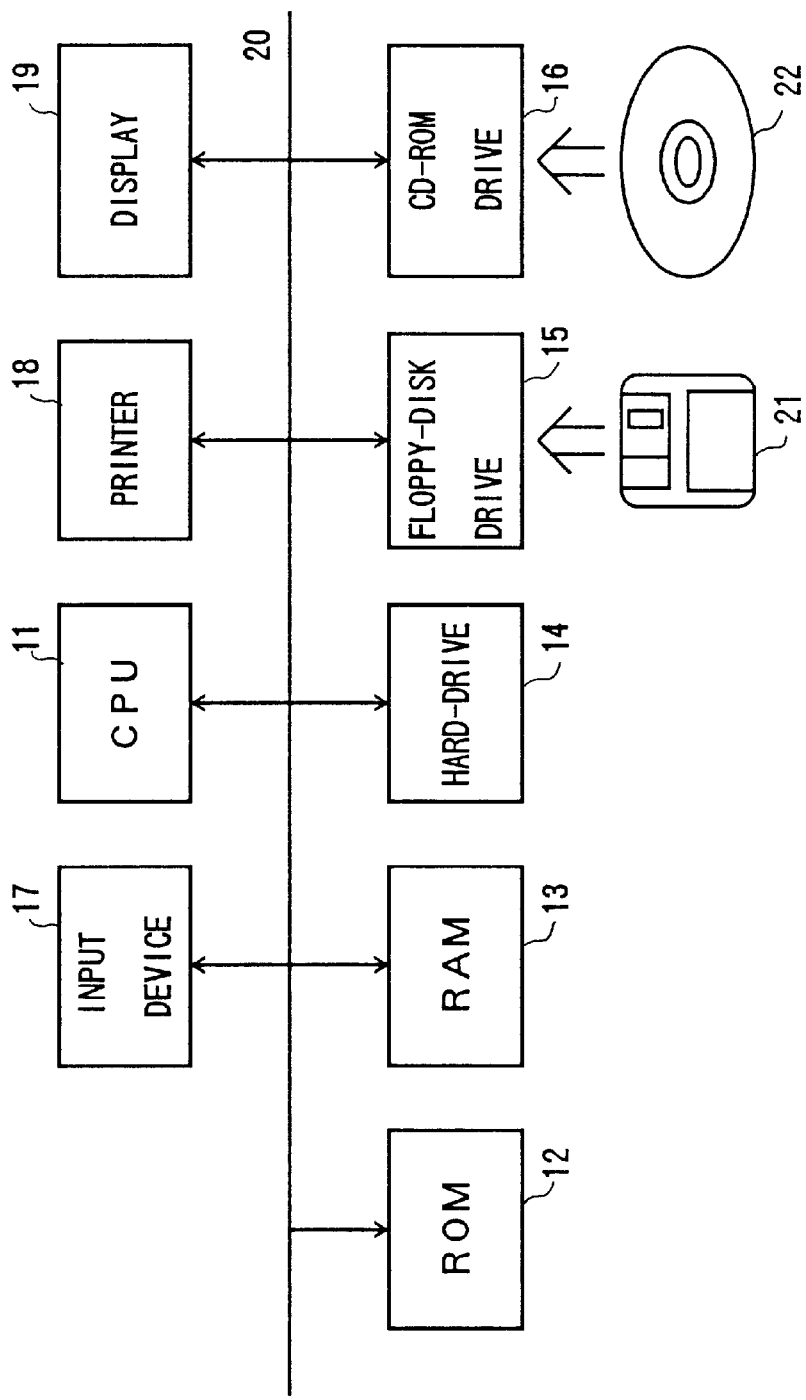
FIG. 6 is a block diagram showing a hardware configuration of the image processing device of FIG. 5.

FIG. 6 is a block diagram showing a hardware configuration of the image processing device of FIG. 5.

The image processing device 1 includes a CPU 11, a ROM 12, a RAM 13, a hard-drive 14, a floppy-disk drive 15, a CD-ROM drive 16, an input device 17, a printer 18, a display 19, and a bus 20.

The CPU 11 performs area-level processing on image data stored in the floppy-disk drive 15 by executing an area-level-processing program loaded into the RAM 13 from the hard-drive 14. Display-dot data obtained through the area-level processing by the CPU 11 is supplied to the printer 18 or to the display 19 for printing/displaying purposes.

The RAM 13 is used as a work area for the CPU 11 when the CPU 11 performs the area-level processing. The ROM 12 stores BIOS and the like. BIOS is executed when the image processing device 1 is powered on, and performs a startup procedure for the system.

The hard-drive 14 stores the area-level-processing program. The area-level processing program is uploaded to the RAM 13 at the time of execution.

The area-level-processing program may be installed from a floppy disk 21 to the hard-drive 14 by using the floppy-disk drive 15, or may be installed from a CD-ROM 22 to the hard-drive 14 by using the CD-ROM drive 16. Alternatively, the area-level-processing program may be executed directly from the floppy disk 21 or the CD-ROM 22.

The input device 17 includes a keyboard, a mouse, or the like, and is used for instructing execution of the area-level processing program or informing the CPU 11 of image data to be processed. The printer 18 prints the display-dot data obtained by the area-level-processing program. The display 19 displays the display-dot data.

The bus 20 connects between the CPU 11, the ROM 12, the RAM 13, the hard-drive 14, the floppy-disk drive 15, the CD-ROM drive 16, the input device 17, the printer 18, and the display 19.

In what follows, the area-level processing by the image processing unit 3 will be described.

Figure 7:
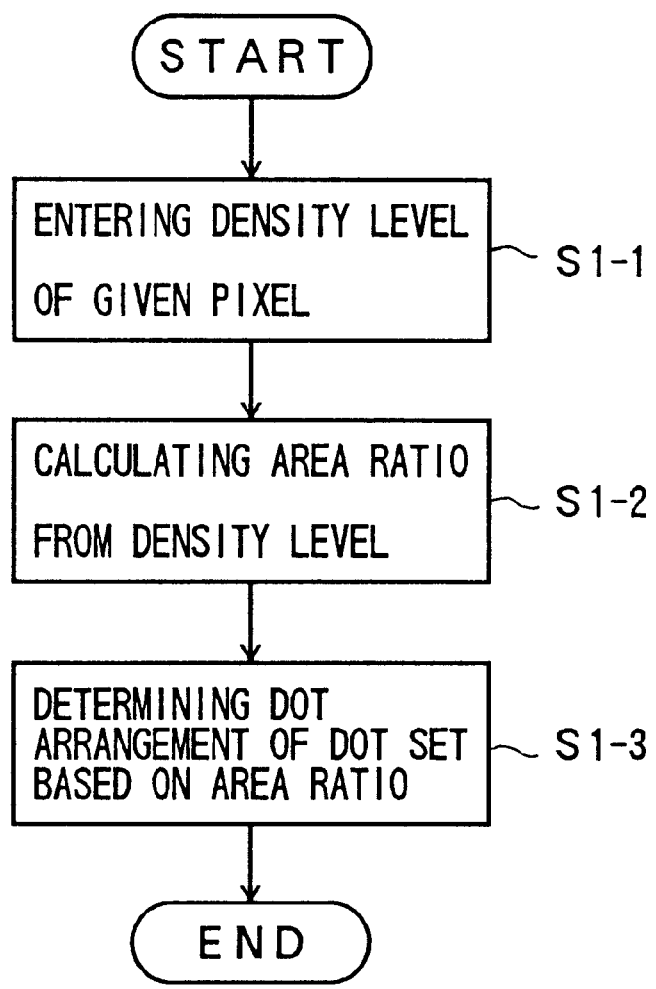
FIG. 7 is a flowchart of area-level processing according to the embodiment of the present invention.

FIG. 7 is a flowchart of the area-level processing according to the embodiment of the present invention.

At a step S1-1, a brightness or density level of a given pixel is entered.

At a step S1-2, an area ratio is calculated from the brightness or the density level of the given pixel entered at the step S1-1. Here, the area ratio is 0 when the density level of the given pixel is the lowest, and is 1 when the density level is the highest.

At a step S1-3, a dot arrangement of a dot set is determined in accordance with the area ratio obtained at the step S1-2.

In what follows, the dot arrangement determined according to the area ratio at the step S1-3 will be described in detail.

A circular shape or ellipse shape is employed as a shape of a dot set according to the present invention because such a shape is most stable and easy to reproduce. A color dot set preferably has a circular or ellipse shape when the area ratio is smaller than 50%, whereas a white dot set preferably has a circular or ellipse shape when the area ratio is greater than 50%.

According to the present invention, a color dot set or a white dot set is generated in such a fashion as to closely approximate for a circular shape throughout its course of dot increases. To this end, an offset is introduced to a position of a dot-set center. Namely, a dot-set center is displaced by a predetermined offset, and dots are printed when these dots are included in a circle having a center thereof at this displaced dot-set center. The circle has a radius generally in accordance with an indicated area ratio.

Figure 8:
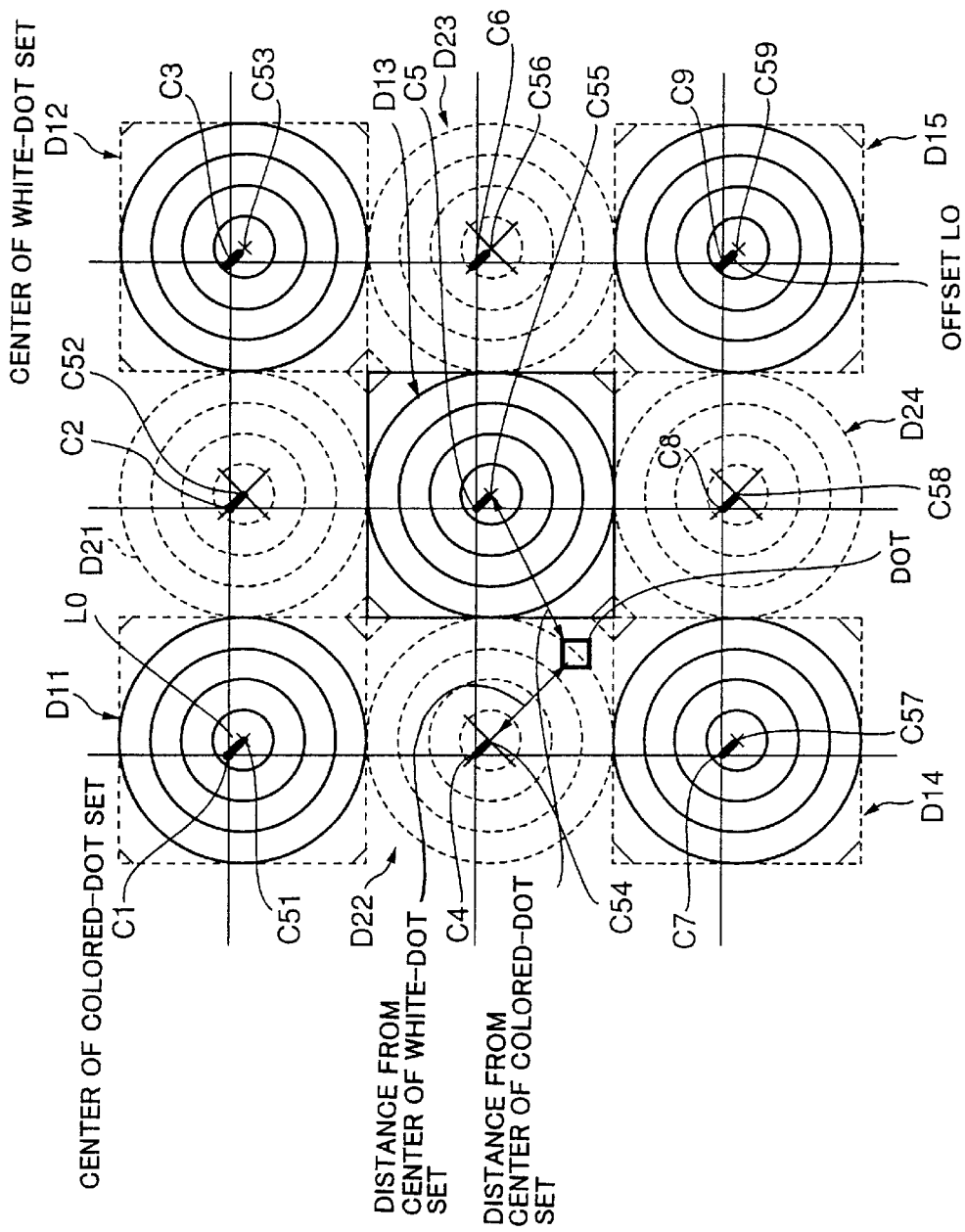
FIG. 8 is an illustrative drawing showing circular dot sets according to the embodiment of the present invention.

FIG. 8 is an illustrative drawing showing circular dot sets according to the embodiment of the present invention.

Figure 1:
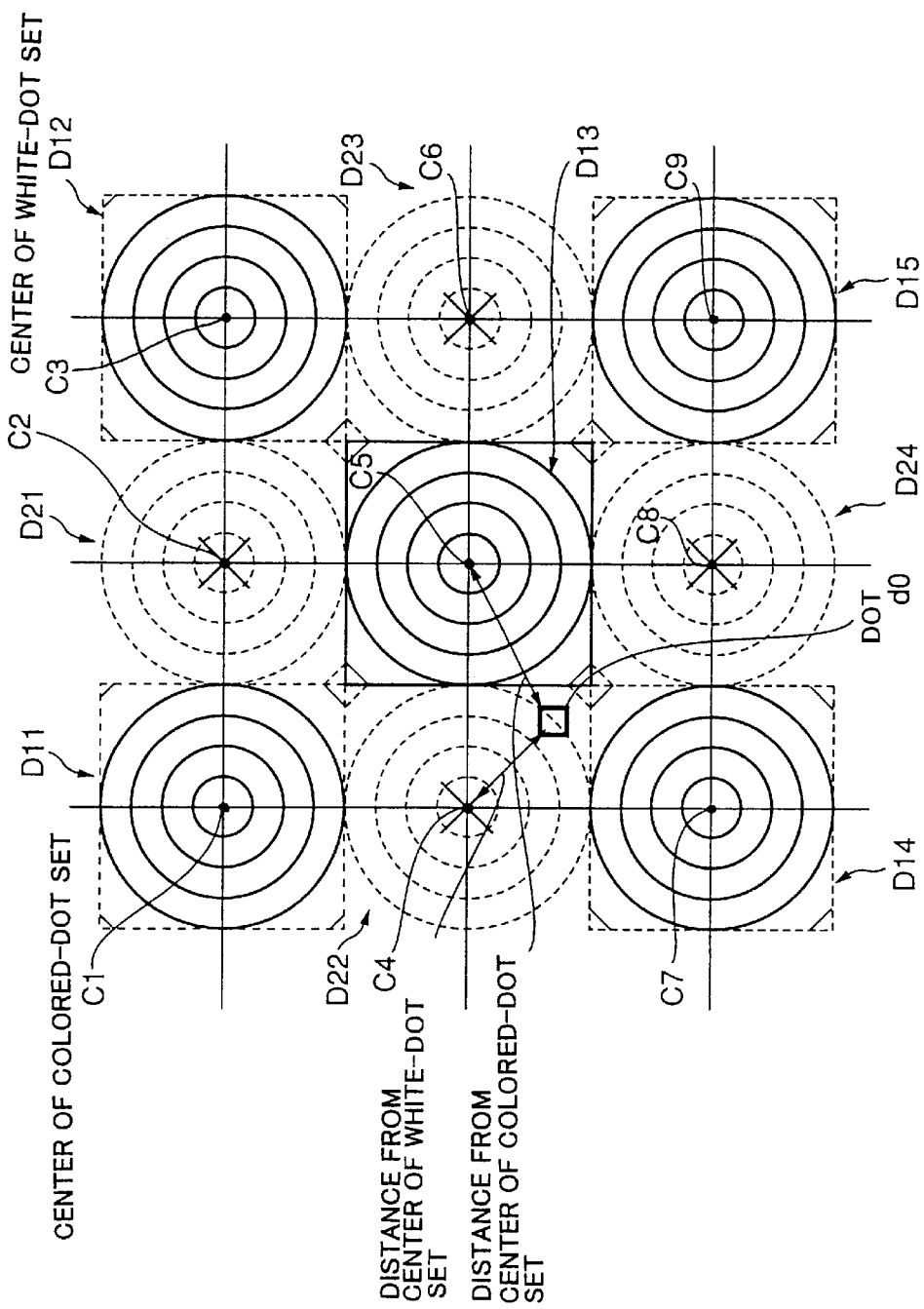
FIG. 1 is an illustrative drawing showing a circular dot set of the related art.
Figure 2:
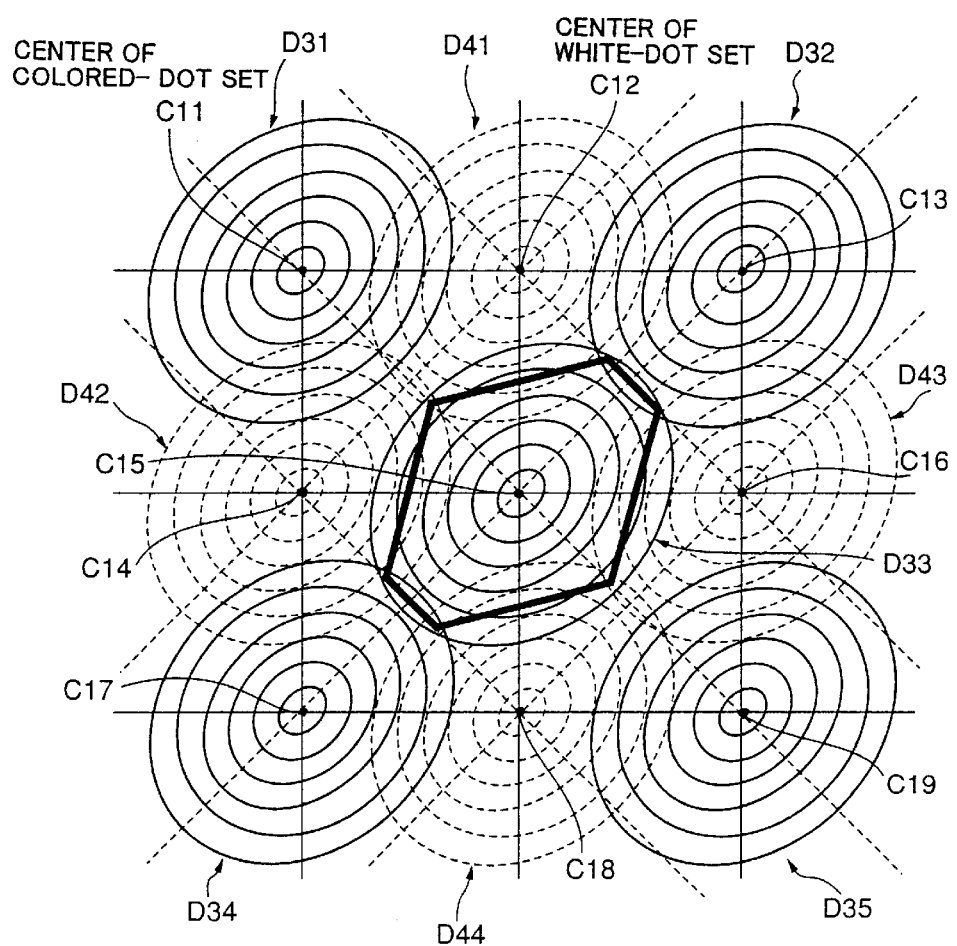
FIG. 2 is an illustrative drawing showing an ellipse dot set of the related art.

In this embodiment, dot-set centers C51 through C59 are provided at positions displaced by an offset L0 from the dot-set centers C1 through C9, respectively. It should be noted that the dot-set centers C1 through C9 originally shown in FIG. 1 are located at corners of pixel boundaries as shown in FIG. 3. Around the dot-set centers C51 through C59, circles having a radius r are considered when the radius r is determined based on the area ratio. Then, all the dots included in these circles are printed as color dots or left as white dots.

FIGS. 9A through 9C are illustrative drawings for explaining the way the circular dot set is generated according to the embodiment of the present invention.

FIG. 9A shows dots to be colored in relation to various radii. FIG. 9B shows an order in which dots are colored in response to radius increases. FIG. 9C shows a relation between the radius and the number of colored dots.

As shown in FIG. 9B, the dot-set centers C51 through C59, which are used as a center of a circle having the radius r, are located at positions that are offset from the original dot-set centers C1 through C9, which coincide with corners of pixels.

As shown in FIG. 9A, dots d1 through d9 are included (i.e., have centers thereof included) in a circle having a radius r1 around a center which corresponds to one of the dot-set centers C51 through C59. Further, dots d1 through d13 are included when a radius r2 is considered. Moreover, dots d1 through d20 are included in a circle having a radius r3 to an increase in the radius.

FIG. 9C shows the number of printed dots in relation to the radius r. As shown in FIG. 9C, the number of dots exhibits a gradual increase as the radius r increases. Namely, when the dot-set centers C51 through C59 are displaced from the original dot-set centers C1 through C9, distances between a given dotset center and surrounding dots are different for each dot, and none of these distances are the same. This insures that printed dots are increased one by one as the radius r increases.

According to the embodiment of the present invention, therefore, a dot set can maintain its approximated circular shape throughout the entire course of its size increase.

It should be noted, here, that a shape of a dot set changes depending on a given offset L0.

Figure 10A:
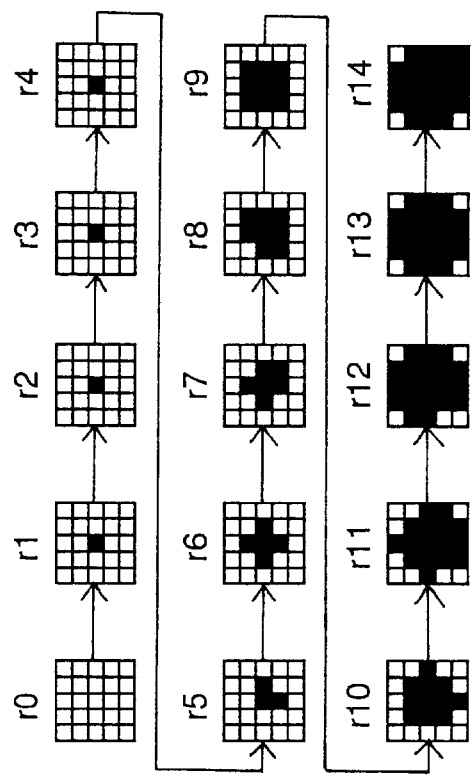
FIGS. 10A and 10B are illustrative drawings for showing a first example of a series of dot-set shapes when a particular offset is employed.
Figure 10B:
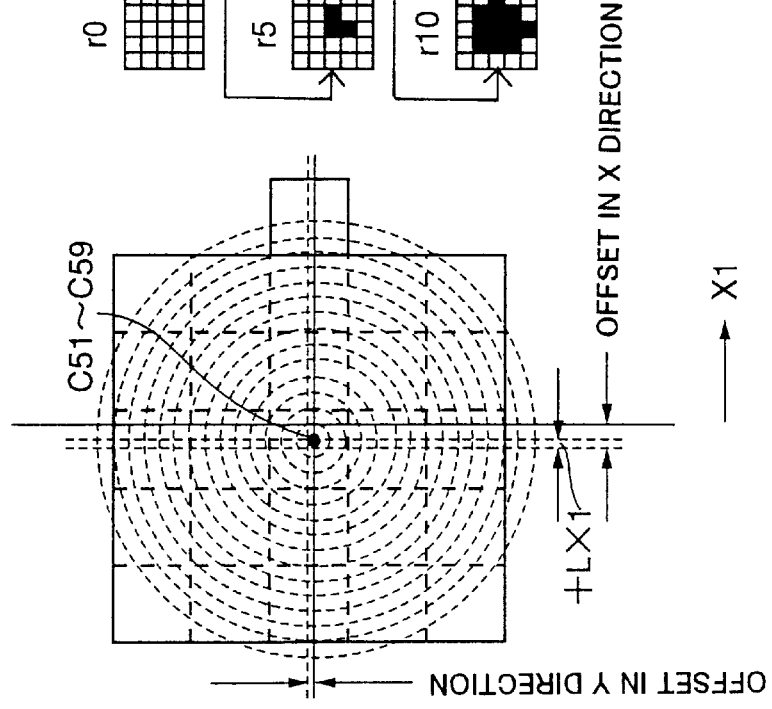

FIGS. 10A and 10B are illustrative drawings for showing a first example of a series of dot-set shapes when a particular offset is employed.

FIG. 10A shows an X-direction offset and a Y-direction offset, and FIG. 10B shows a series of dot sets that are obtained when a radius is gradually increased. FIGS. 10A and 10B demonstrate a case in which an X-direction offset is +Lx1, and a Y-direction offset is Ly. It should be noted that a reference point (i.e., original dot-set center) from which the offset is added is situated at a center of a dot in this example.

Figure 11A:
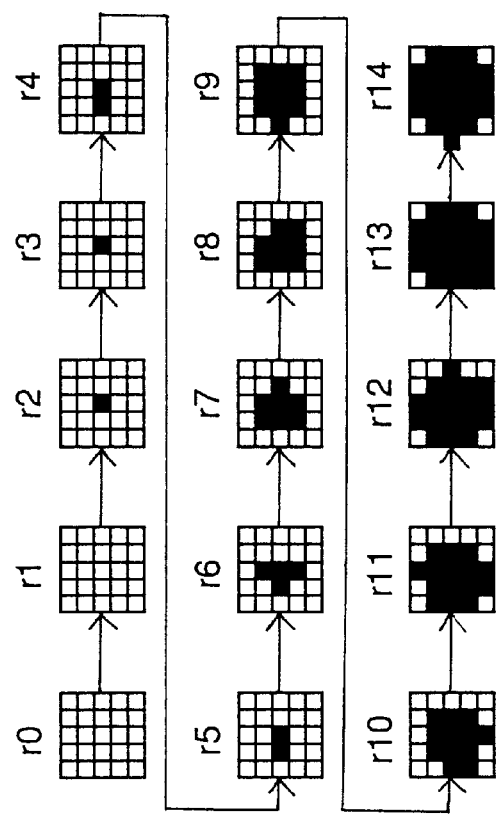
FIGS. 11A and 11B are illustrative drawings for showing a second example of a series of dot-set shapes when a particular offset is employed.
Figure 11B:
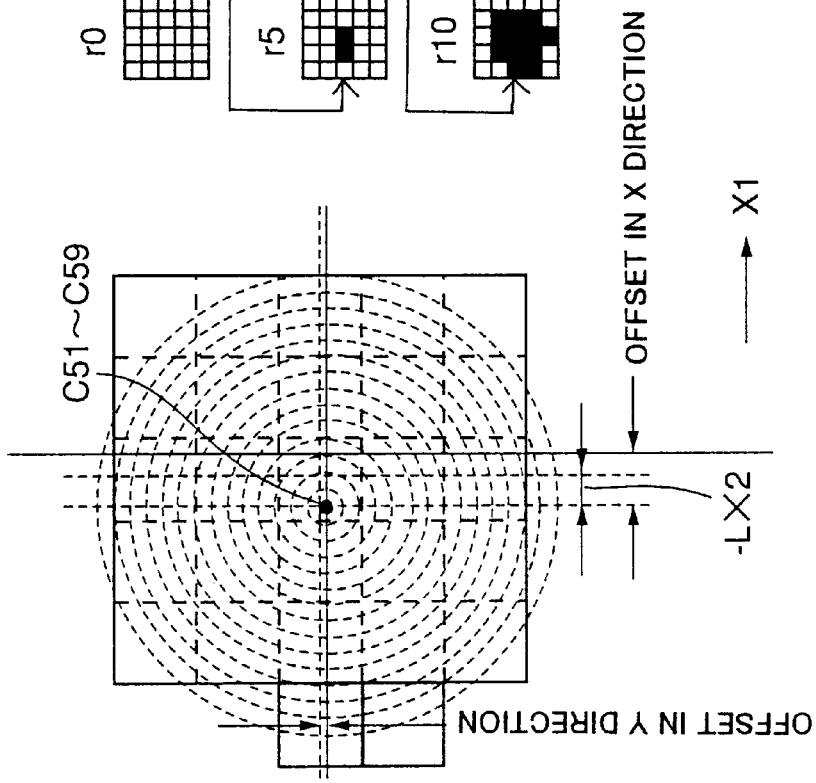

FIGS. 11A and 11B are illustrative drawings for showing a second example of a series of dot-set shapes when a particular offset is employed. FIGS. 11A and 11B demonstrate a case in which an X-direction offset is −Lx2, and a Y-direction offset is Ly.

Figure 12A:
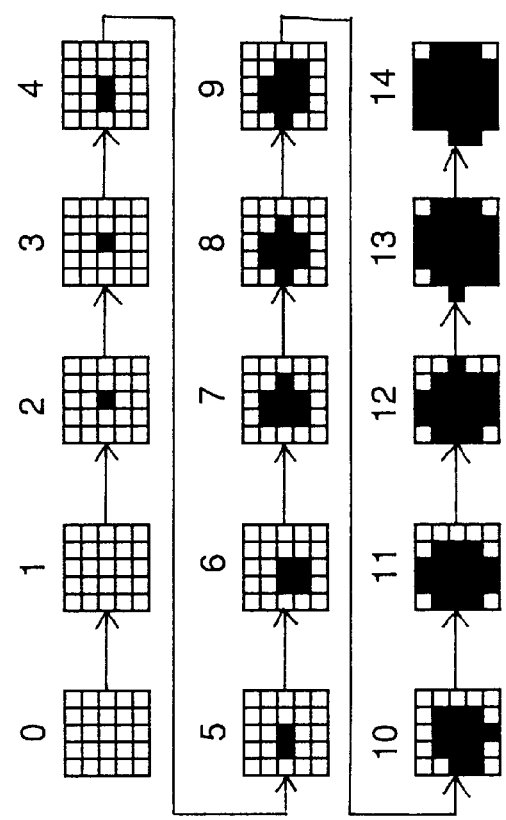
FIGS. 12A and 12B are illustrative drawings for showing a third example of a series of dot-set shapes when a particular offset is employed.
Figure 12B:
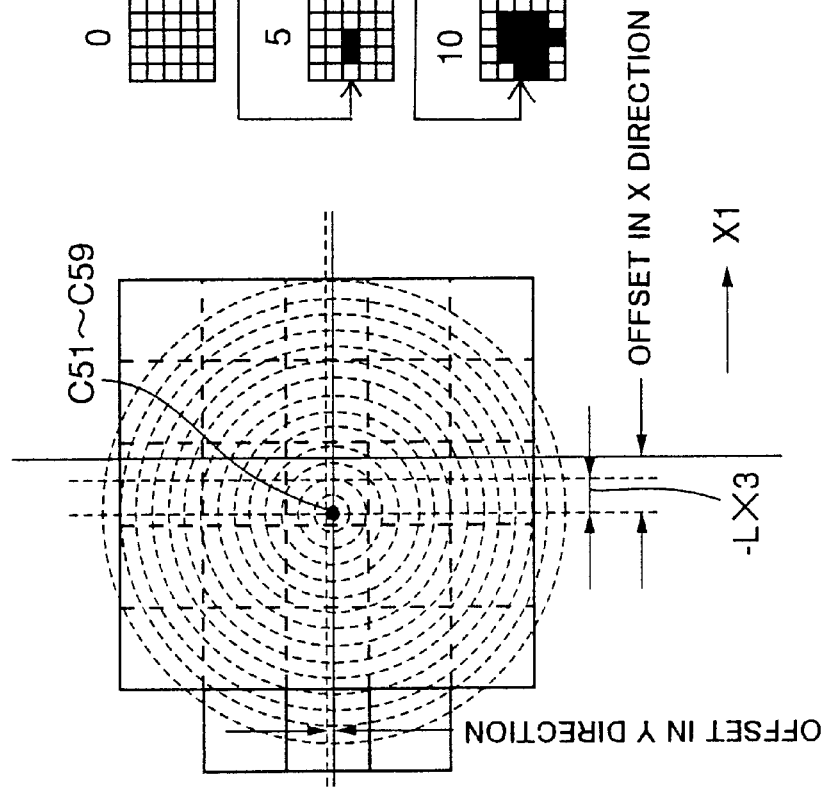

FIGS. 12A and 12B are illustrative drawings for showing a third example of a series of dot-set shapes when a particular offset is employed. FIGS. 12A and 12B demonstrate a case in which an X-direction offset is −Lx3, and a Y-direction offset is Ly.

Figure 13A:
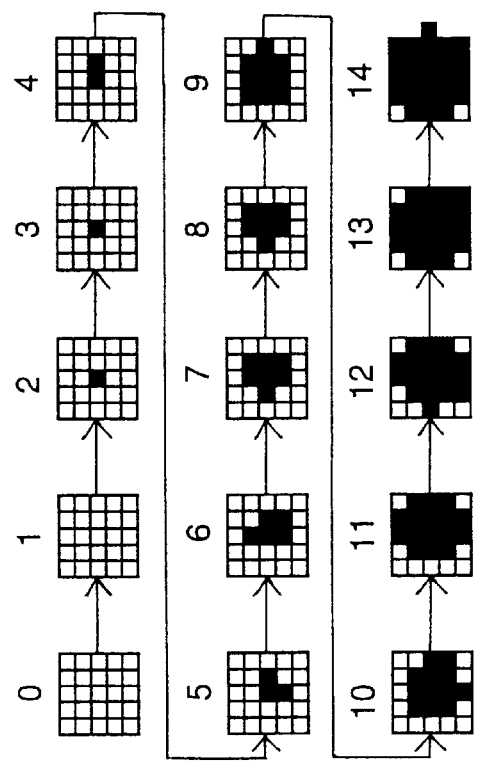
FIGS. 13A and 13B are illustrative drawings for showing a fourth example of a series of dot-set shapes when a particular offset is employed.
Figure 13B:
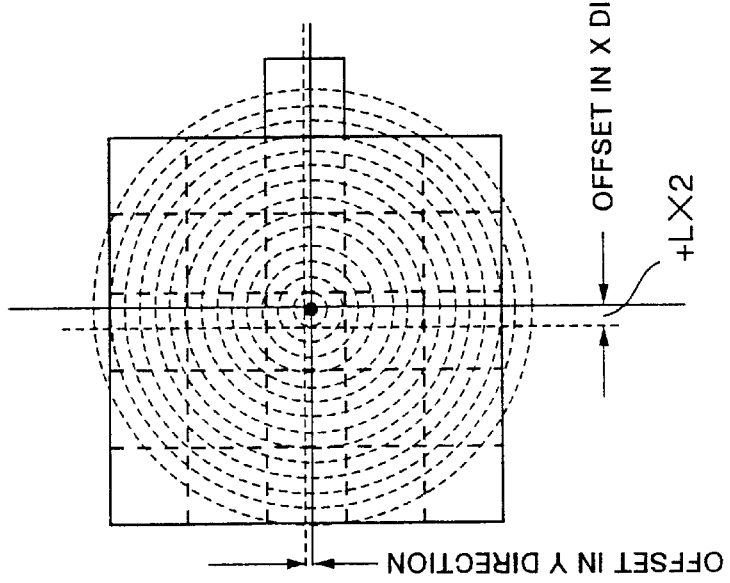

FIGS. 13A and 13B are illustrative drawings for showing a fourth example of a series of dot-set shapes when a particular offset is employed. FIGS. 13A and 13B demonstrate a case in which an X-direction offset is +Lx2, and a Y-direction offset is Ly.

Figure 14A:
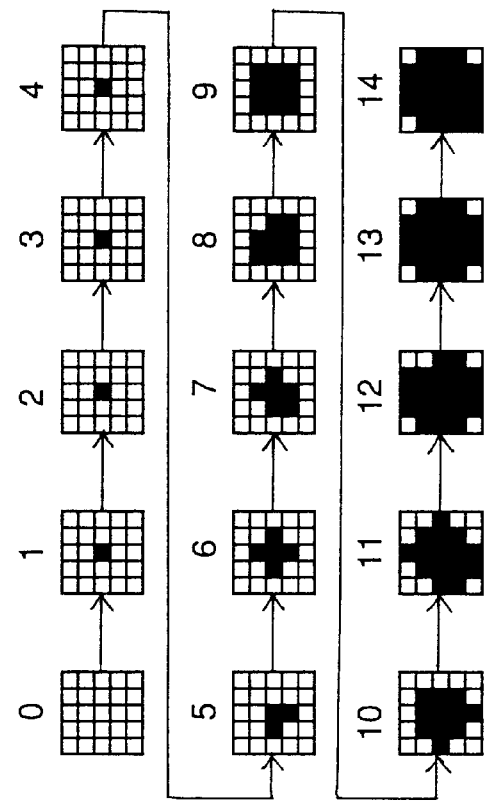
FIGS. 14A and 14B are illustrative drawings for showing a fifth example of a series of dot-set shapes when a particular offset is employed.
Figure 14B:
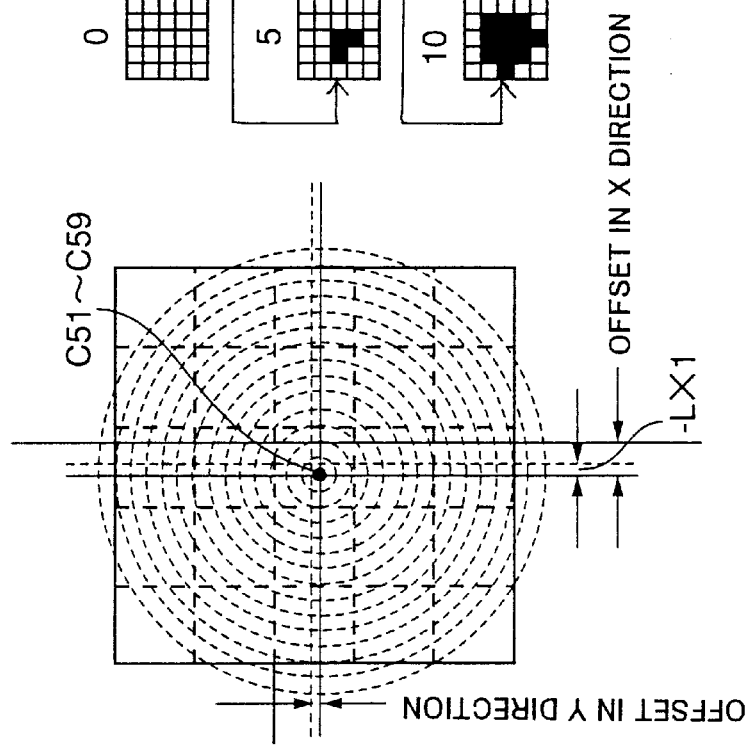

FIGS. 14A and 14B are illustrative drawings for showing a fifth example of a series of dot-set shapes when a particular offset is employed. FIGS. 14A and 14B demonstrate a case in which an X-direction offset is −Lx1, and a Y-direction offset is Ly.

As can be seen from these figures, the way the dots are increased differs, depending on the offset. It was learned that an optimal offset varies, depending on a dot shape and a dot diameter.

Where circular dots have a dot diameter that is equal to a dot pitch, a vertical offset of 0.16 dot and a horizontal offset of 0.34 dot showed optimal results when these offsets were added to a center point of a dot. Here, the dot diameter is scaled as 1 dot. The same results are obtained when a vertical offset of 0.34 dot and a horizontal offset of 0.16 are used.

Where a dot diameter is twice a dot pitch, a vertical offset of 0.14 dot and a horizontal offset of 0.34 dot showed optimal results when these offsets were added to a center point of a dot. The same results are obtained when a vertical offset of 0.34 dot and a horizontal offset of 0.14 are used.

It should be noted that the optimal results mean that the number of dots increases one by one in response to a diameter increase, that a sot-set shape is as close to a circular shape as possible, and that the offset is as small as possible. These conditions relate to a smooth gradation of half-tone representation, stable reproduction of dot-set shapes, and high quality of a resulting image, respectively.

Further, where ellipse dots have a width equal to a dot pitch, and have a length twice the dot pitch, a vertical offset of 0.316 dot and a horizontal offset of 0.25 dot showed optimal results when these offsets were added to a center point of a dot.

In the following, details of generating a dot set will be described.

With reference to the flowchart of FIG. 7 again, the area ratio is obtained from the density level of a specified pixel at the step S1-2, and the dot arrangement is obtained at the step S1-3 from the area ratio. In detail, this dot arrangement is derived from a table that is prepared in advance and identifies dots to be colored pursuant to a given area ratio.

In what follows, the table for determining dots to be colored will be described.

Figure 15:
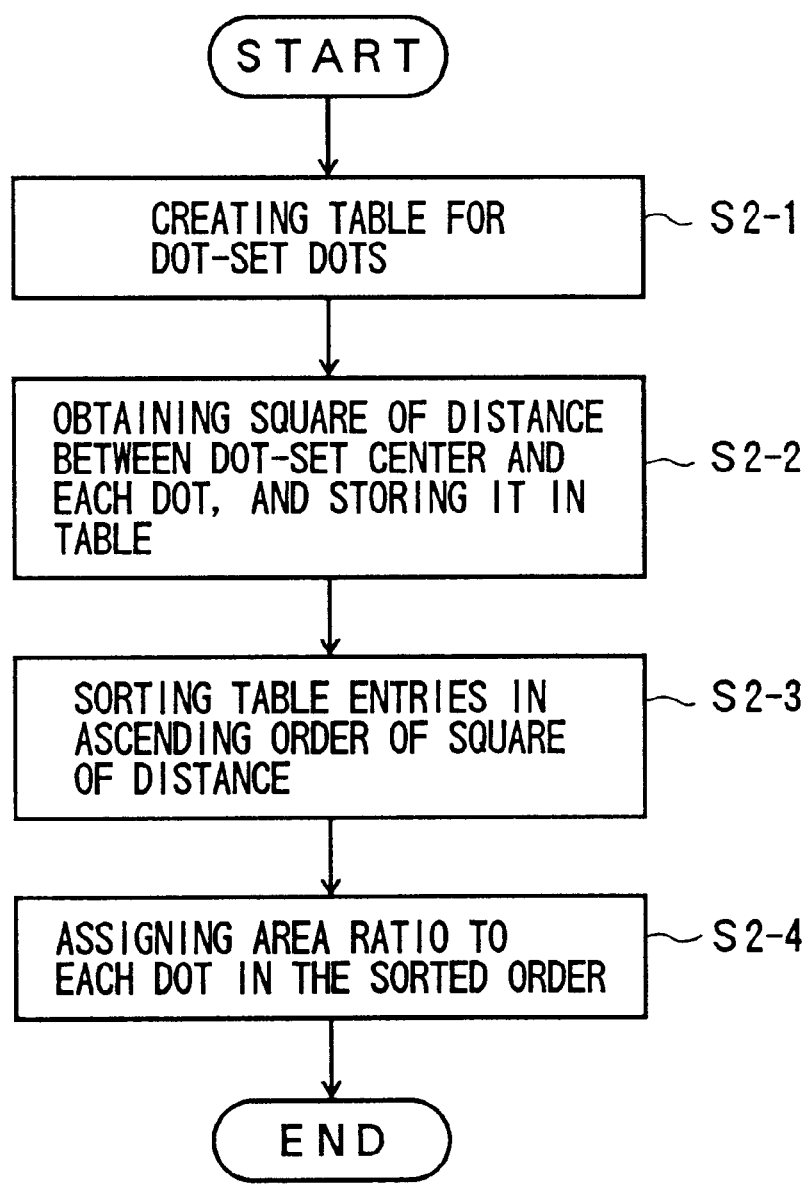
FIG. 15 is a flowchart of a process of generating a colored-dot-determination table according to the embodiment of the present invention.

FIG. 15 is a flowchart of a process of generating a colored-dot-determination table according to the embodiment of the present invention.

At a step S2-1, a table is created in such a fashion as to have a data-storage space for each dot after identifying all the dots that can be used for making up a dot set.

At a step S2-2, a square of a distance between a dot-set center and each dot is calculated and stored in a corresponding storage space of the table.

At a step S2-3, entries of the table are sorted in an ascending order of the square of the distance.

At a step S2-4, area ratios are assigned to each dot in the sorted order.

This ends the procedure for generating the colored-dot-determination table.

FIG. 16 is an illustrative drawing showing a data structure of the colored-dot-determination table according to the embodiment of the present invention.

A colored-dot-determination table 100 includes fields of entries for an area ratio 101, a dot number 102, and distance information 103. The dot number 102 identifies each dot, and the distance information 103 relates to a distance between a dot-set center and each dot, which is used as a key for the sorting.

The area ratio 101 ranges from 0 to 1, and has a value pursuant to a density level of an image. In the table, the area ratio 101 serves as an address of dot entries.

The dot number 102 identifies each dot, and is assigned to each dot in advance. Dot numbers d1 through dn may be assigned in this order to respective dots that are arranged in the sorted order obtained at the step S2-3 of FIG. 15, and are stored as entries in the field of the dot number 102.

The distance information 103 is a square of a distance between a dot-set center and each dot as obtained at the step S2-2 of FIG. 15. The distance information 103 is used only for the sorting purpose at the step S2-3.

In the following, the area ratio will be described.

Figure 17:
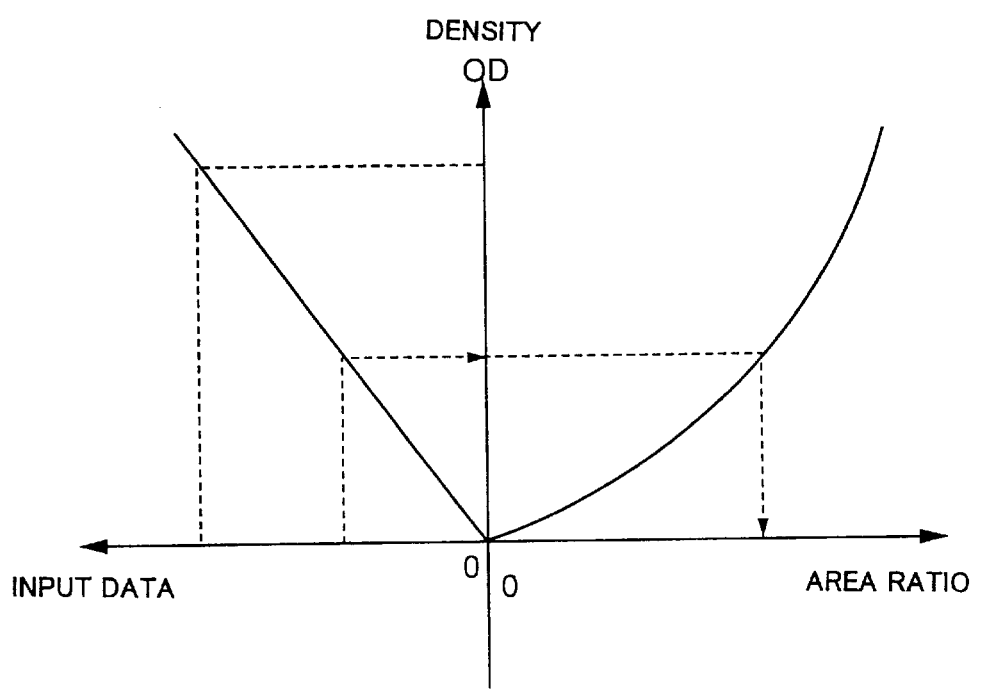
FIG. 17 is an illustrative drawing showing a relation between a density level and an area ratio.

FIG. 17 is an illustrative drawing showing a relation between a density level and an area ratio.

Input data 0 through FF are provided in accordance with respective density levels. As shown in FIG. 17, the input data has a linear relation with the density level. Further, the density level correspond to area ratio in a non-linear fashion.

As show in FIG. 17, the area ratio maintains a one-to-one correspondence with the input data. A conversion table is provided for the purpose of converting the input data 0 through FF to the area ratio.

Figure 18:
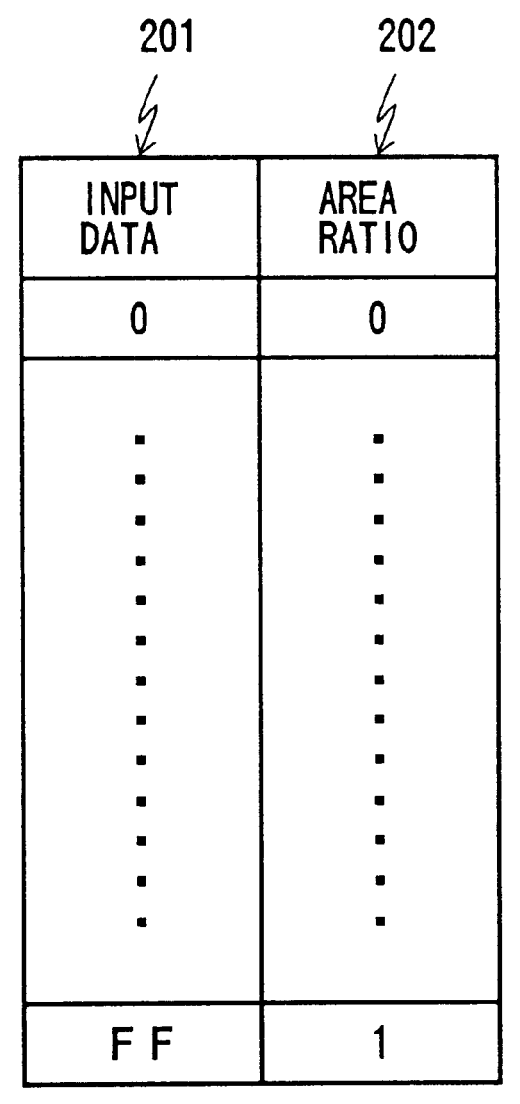

FIG. 18 is an illustrative drawing showing a data structure of a conversion table according to the embodiment of the present invention.

A conversion table 200 of FIG. 19 includes as fields of data entries the input data 201 and the area ratio 202. The input data 201 stores input data serving as an address in the table. When input data is given, the input data 201 of the conversion table 200 is looked up to find a corresponding input-data entry, and, then, an area ratio corresponding to this input-data entry is obtained.

The area ratio obtained from the conversion table 200 is looked for in the colored-dot-determination table 100 of FIG. 16, and a corresponding dot number is obtained. All the dots that have dot numbers lower than or equal to the obtained dot number are printed in color.

In this manner, a dot set is created as shown in FIGS. 9A through 9C.

In the embodiment described above, input data is converted to an area ratio via the conversion table 200, and dots to be colored are determined by finding the obtained area ratio in the colored-dotdetermination table 100. Alternatively, the input data may be provided as entries in place of the area ratio in the colored-dot-determination table 100, so that an input data entry is looked for in the colored-dot-determination table 100 to determine the dots to be colored.

Further, the present invention is not limited to these embodiments, but various variations and modifications may be made without departing from the scope of the present invention.

For example, the present invention is applicable to a case where an ellipse shape is used. In this case, a distance factor df between a dot and a dot-set center is given by the following equation.

$$df = [a^2(x-Lx)^2 + b^2(y-Ly)^2]^{1/2}$$

or $$[a^2(t\cos\theta - Lx)^2 + b^2(t\sin\theta - Ly)^2]^{1/2}$$

(θ: angle of rotation)

The present application is based on Japanese priority application No. 11-098132 filed on Apr. 5, 1999, with the Japanese Patent Office, the entire contents of which are hereby incorporated by reference.

What is claimed is:

1. A method of representing a half-tone level with dot sets each comprised of contiguous dots, comprising the steps of:
providing a dot-set center at an offset point that is neither a center of a dot nor a midpoint between centers of dots;
selecting dots that are included inside a symmetric-shape area having a center thereof at the dot-set center, an area size of the symmetric-shape area being commensurate with an input image level; and
representing a half-tone level corresponding to the input image level by forming a dot set comprised of the selected dots.

2. The method as claimed in claim 1, wherein the symmetric-shape area is circular.

3. The method as claimed in claim 2, wherein said step of selecting dots selects dots each having a center thereof inside the symmetric-shape area.

4. The method as claimed in claim 3, further comprising a step of determining the offset point such that no dots have centers thereof equal distance from the dot-set center.

5. The method as claimed in claim 3, further comprising a step of determining the offset point such that a shape of the dot set comprised of the selected dots approximate for a circular shape as close as possible.

6. The method as claimed in claim 3, further comprising a step of determining the offset point such that a distance between the offset point and the center of the dot is as small as possible.

7. The method as claimed in claim 1, wherein the symmetric-shape area is oval.

8. The method as claimed in claim 7, wherein said step of selecting dots selects dots each having a center thereof inside the symmetric-shape area.

9. The method as claimed in claim 8, further comprising a step of determining the offset point such that no dots have centers thereof equal distance from the dot-set center.

10. The method as claimed in claim 1, wherein the dot set comprised of the selected dots is a colored set when the input image level corresponds to an area ratio substantially lower than 50%, and is a white set when the input image level corresponds to an area ratio substantially higher than 50%.

11. A device for representing a half-tone level with dot sets each comprised of contiguous dots, comprising:
a CPU;
a memory unit which stores a program; and
an output unit which outputs an image, wherein said CPU executes the program to select dots that are included inside a symmetric-shape area having a center thereof at a dot-set center that is neither a center of a dot nor a midpoint between centers of dots, an area size of the symmetric-shape area being commensurate with an input image level, and said output unit represents a half-tone level corresponding to the input image level by forming a dot set comprised of the selected dots.

12. The device as claimed in claim 11, wherein the symmetric-shape area is circular.

13. The device as claimed in claim 12, wherein a check as to whether a given dot is included inside the symmetric-shape area is made by checking if a center of the given dot is included inside the symmetric-shape area.

14. The device as claimed in claim 13, wherein the dot-set center is positioned such that no dots have centers thereof equal distance from the dot-set center.

15. A machine-readable memory medium having a program embodied therein for causing a computer to represent a half-tone level with dot sets each comprised of contiguous dots, said program comprising:

a program-code unit which selects dots included inside a symmetric-shape area having a center thereof at a dot-set center that is neither a center of a dot nor a midpoint between centers of dots, an area size of the symmetric-shape area being commensurate with an input image level; and a program-code unit which represents a half-tone level corresponding to the input image level by forming a dot set comprised of the selected dots.

16. The machine-readable memory medium as claimed in claim 15, wherein the symmetric-shape area is circular.

17. The machine-readable memory medium as claimed in claim 16, wherein a check as to whether a given dot is included inside the symmetric-shape area is made by checking if a center of the given dot is included inside the symmetric-shape area.

18. The machine-readable memory medium as claimed in claim 17, wherein the dot-set center is positioned such that no dots have centers thereof equal distance from the dot-set center.

* * * * *